G. L. JONES.
KEEL FOR CULTIVATORS.
APPLICATION FILED MAR. 18, 1912.
1,109,532.
Patented Sept. 1, 1914.
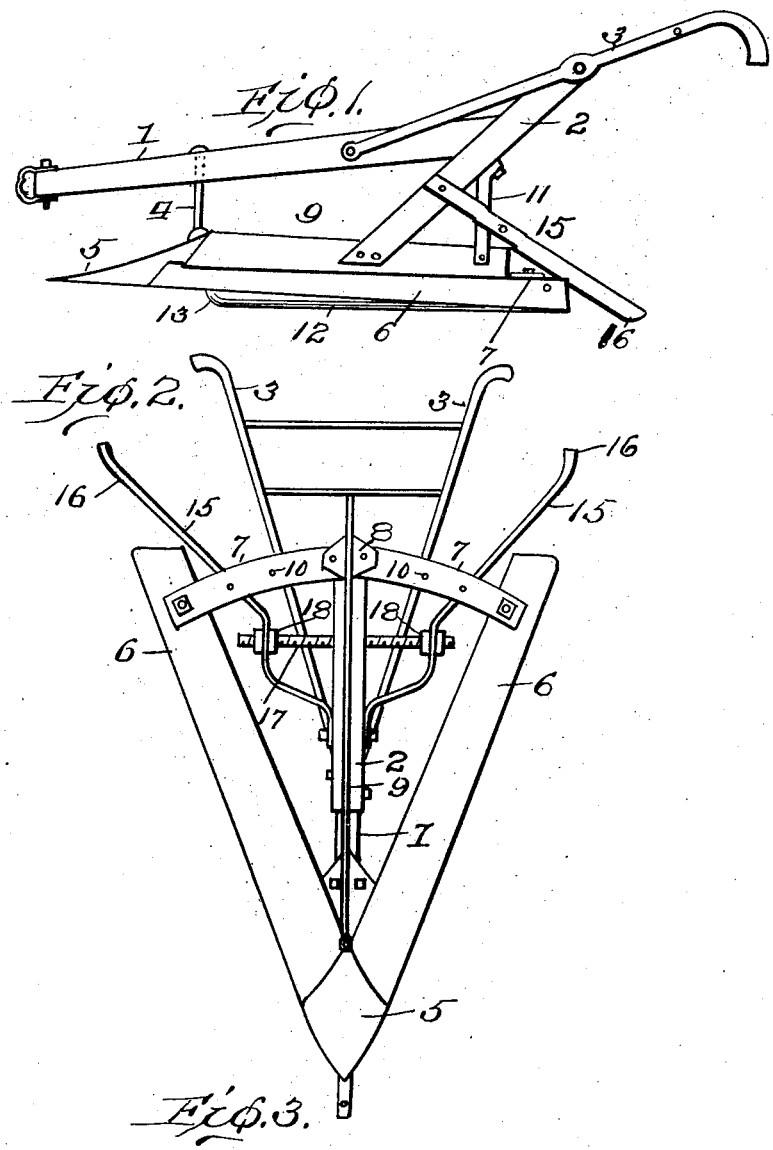
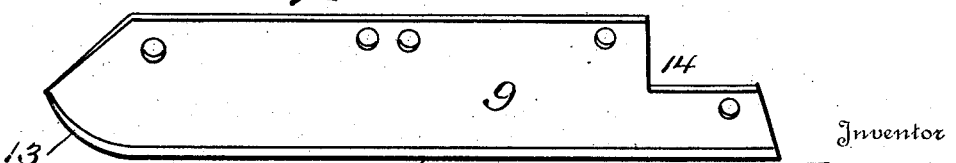
Witnesses
J. M. Fowler Jr
N. E. Berry
Inventor
George L. Jones
By Carey S. Frye
Attorney

UNITED STATES PATENT OFFICE.

GEORGE LANDER JONES, OF KENNEWICK, WASHINGTON.

KEEL FOR CULTIVATORS.

1,109,532.  Specification of Letters Patent.  Patented Sept. 1, 1914.

Application filed March 18, 1912.  Serial No. 684,371.

*To all whom it may concern:*

Be it known that I, GEORGE LANDER JONES, a citizen of the United States, residing at Kennewick, in the county of Benton and State of Washington, have invented certain new and useful Improvements in Keels for Cultivators; and I do hereby declare the following to be a full, clear, and exact description of the invention, such as will enable others skilled in the art to which it appertains to make and use the same.

My invention relates to new and useful improvements in cultivators and more particularly to that class adapted to be used as a combined weeder and cultivator and my object is to provide adjustable radiating blades which are adapted to enter the soil to a slight depth and destroy any weeds or other particles growing thereon, as well as agitate the soil.

A further object is to provide adjustable means for moving portions of the soil toward the growing plants, and, a further object is to provide means for preventing lateral movement of the cultivator while in use.

Other objects and advantages will be hereinafter set forth and pointed out in the following specification.

In the accompanying drawings which are made a part of this application, Figure 1 is a side elevation of the cultivator complete. Fig. 2 is a bottom plan view thereof, and, Fig. 3 is a perspective view of the guiding mechanism or feel removed from the cultivator.

Referring to the drawings in which similar reference numerals designate corresponding parts throughout the several views, 1 indicates the beam of the cultivator which may be constructed in the usual or any preferred manner; 2 indicates the standard attached adjacent the rear end of the beam and 3 indicates the usual form of handles for the cultivator. Depending from the forward portion of the beam 1 is a rod or standard 4 to which is attached a mold board or shovel 5 and to the edges of said mold board are pivotally attached the forward ends of blades 6, said blades being so arranged as to extend at an angle to each other to provide in connection with the mold board a substantially V-shaped structure.

The cultivator is adapted primarily for cultivating the soil between rows of growing plants and as the rows vary in width the blades are arranged to be moved inwardly or outwardly from the center of the cultivator, the rear end portions of the blades having inwardly extending arms 7 pivotally attached thereto, the inner ends of which arms are engaged with a keeper 8 carried by the keel or guiding mechanism 9 of the cultivator and by providing a plurality of openings 10 in the two arms 7, the blades may be shifted to various angles to increase or decrease the width of the cultivator. The forward end of the keel 9 is secured to the rod 4 and in position below the mold board 5, said keel being also secured to the lower end of the standard 2 in any preferred manner, while a brace 11 projects downwardly from the rear end of the beam 1 and is secured to the keel adjacent the rear end thereof. The keel or guiding mechanism extends centrally between the blades 6, the lower edge 12 and forward edge 13 of the keel being preferably sharpened or tapered to form a cutting edge whereby the keel will readily travel through the soil.

The lower front edge of the keel 9 is slightly curved upwardly, the lower edge of the keel extending below the plane of the lower edges of the blades 6 and, as best shown in Fig. 1, the forward portion of the keel extends the greater distance below the plane of the blades. By arranging the keel in this manner the lower edge thereof readily enters the solid portion of the soil or that portion of the soil not loosened by the blades and by having the point of greatest depth adjacent the forward ends of the blades the cultivator will be kept in a straight line and prevented from moving sidewise so that the outer edges of the blades may be moved to travel in close proximity to the growing plants.

As the keel extends above the plane of the blades a considerable distance, a portion of the rear end of the keel is cut away at its upper edge to form an offset 14 and on the offset portion is placed the keeper 8 with which the ends of the arms 7 engage.

The blades 6 are so arranged as to give a more or less shallow cultivation and as it is desirable at times to move a certain amount of the earth toward the growing plants, I provide a pair of hilling bars 15, which are attached at their inner ends to the standard 2 and have their outer ends extended outwardly and downwardly so that they will be in position to engage the soil at a point adjacent the rear ends of the blades and said ends are so curved as to present a convex surface 16 to the soil, causing the soil to travel toward the rows of growing plants. The extreme lower ends of the hilling bars 15 are curved on their forward edge so that the bars will more readily engage the soil. As the blades 6 are adjusted inwardly and outwardly to accommodate the cultivator to rows of varying widths, the bars 15 must be likewise adjusted and to accomplish this result a threaded rod 17 is extended from one of the bars to the other and through the bars, lock nuts 18 being placed on opposite sides of the bars and by providing threads on the rod 17, the bars 15 may be readily adjusted.

This form of cultivator can be very cheaply constructed and by arranging the keel as shown, the lateral movement of the cultivator will be fully guarded against and by curving the lower front edge of the keel as shown, the keel will readily enter the hardest soil to its full depth, thus firmly engaging the keel with the soil at the point of greatest lateral strain upon the cultivator. It will likewise be seen that by providing the bars and arranging them in the manner shown, a supply of earth can be moved into engagement with the growing plants, thus forming a hill or ridge for the plants and it will likewise be seen that by arranging the blades and bars so that they can be adjusted inwardly or outwardly, the cultivator can be used between rows of varying distances apart.

What I claim is:

1. The combination with a cultivator comprising a mold board and blades extending rearwardly from the mold board and at an angle to each other, of a keel extending longitudinally of the cultivator the full length of said blades, the forward end thereof being attached to the under face of the mold board, the lower front edge of said keel being curved and extended below the lower edges of the mold board and blades the forward end of the keel being extended a greater distance below the blade than the rear end.

2. The combination with a cultivator comprising a beam, a rod extending downwardly from the forward portion of the beam, a standard at the rear end of the beam, a mold board attached to said rod and a pair of blades pivotally attached to and extending rearwardly from the mold board, of a keel attached at its forward end to said rod and engaging the lower end of the standard, said keel extending the full length of said blades and having its lower edge extending in a plane below the lower edges of the blades, the forward end of the keel extending a greater distance below the blades than the rear end, the forward and lower edges of the keel being tapered to a cutting edge, said keel having its lower front edge curved.

GEORGE LANDER JONES.

Witnesses:
  BLANCHE SETZER,
  MARK M. MOULTON.

---

Copies of this patent may be obtained for five cents each, by addressing the "Commissioner of Patents, Washington, D. C."